US008887505B2

(12) United States Patent
Iijima et al.

(10) Patent No.: US 8,887,505 B2
(45) Date of Patent: Nov. 18, 2014

(54) CARBON DIOXIDE RECOVERY SYSTEM AND METHOD

(75) Inventors: Masaki Iijima, Tokyo (JP); Tetsuya Imai, Tokyo (JP); Keiji Fujikawa, Tokyo (JP); Tatsuya Tsujiuchi, Tokyo (JP); Tsuyoshi Oishi, Tokyo (JP); Hiroshi Tanaka, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 704 days.

(21) Appl. No.: 12/641,466

(22) Filed: Dec. 18, 2009

(65) Prior Publication Data

US 2011/0011088 A1    Jan. 20, 2011

(30) Foreign Application Priority Data

Jul. 17, 2009    (JP) ................................ 2009-169322

(51) Int. Cl.

| F01K 7/34 | (2006.01) |
| F01K 13/00 | (2006.01) |
| F02C 3/00 | (2006.01) |
| B01D 53/14 | (2006.01) |
| B01D 53/56 | (2006.01) |
| F01K 7/02 | (2006.01) |
| F01K 17/06 | (2006.01) |
| B01D 53/77 | (2006.01) |

(52) U.S. Cl.
CPC ........ *B01D 53/1475* (2013.01); *B01D 53/1412* (2013.01); *F01K 7/025* (2013.01); *F01K 13/00* (2013.01); *F01K 17/06* (2013.01); *B01D 53/77* (2013.01); *B01D 2257/504* (2013.01); *B01D 2258/01* (2013.01); *Y02C 10/04* (2013.01); *Y02C 10/06* (2013.01)
USPC ............... 60/653; 60/645; 60/39.01; 423/220

(58) Field of Classification Search
USPC ........................ 60/653, 645, 39.01; 423/220
See application file for complete search history.

(56) References Cited

U.S. PATENT DOCUMENTS 4,883,519 A * 11/1989 Agrawa et al. ................... 62/652
5,203,159 A *  4/1993 Koizumi et al. ................. 60/773

(Continued)

FOREIGN PATENT DOCUMENTS

| AU | 2010202117 A1 | 12/2010 |
| CA | 2709290 A1 | 6/2009 |

(Continued)

OTHER PUBLICATIONS

Australian Official Decision to Grant dated Jul. 14, 2011, issued in corresponding Australian Patent Application No. 2009251187.

(Continued)

*Primary Examiner* — Kenneth Bomberg
*Assistant Examiner* — Deming Wan
(74) *Attorney, Agent, or Firm* — Westerman, Hattori, Daniels & Adrian, LLP

(57) ABSTRACT

Provided are high-pressure, medium-pressure, and low-pressure turbines; a boiler to generate steam for driving the turbines; a carbon dioxide recovery unit including an absorber that reduces carbon dioxide in combustion flue gas from the boiler by a carbon dioxide absorbent and a regenerator that regenerates an absorbent; a first auxiliary turbine that extracts steam from an inlet of the low-pressure turbine and recovers power by the steam thus extracted; a first steam delivery line to supply discharged steam from the first auxiliary turbine to a reboiler of the regenerator as a heat source; and a controller that controls driving of the first auxiliary turbine while keeping pressure of the discharged steam to be supplied to the reboiler within a tolerance range for the reboiler's optimum pressure corresponding to a fluctuation in an operation load of the boiler.

5 Claims, 8 Drawing Sheets

(56) References Cited

U.S. PATENT DOCUMENTS

| | | | |
|---|---|---|---|
| 5,344,627 A * | 9/1994 | Fujii et al. | 423/220 |
| 5,361,585 A * | 11/1994 | Westphal et al. | 60/646 |
| 6,883,327 B2 * | 4/2005 | Iijima et al. | 60/649 |
| 7,488,463 B2 * | 2/2009 | Iijima et al. | 423/220 |
| 2001/0039760 A1 * | 11/2001 | Cheng | 48/197 R |
| 2003/0131582 A1 * | 7/2003 | Anderson et al. | 60/39.55 |
| 2004/0221578 A1 | 11/2004 | Iijima et al. | |
| 2006/0248890 A1 | 11/2006 | Iijima et al. | |

FOREIGN PATENT DOCUMENTS

| | | |
|---|---|---|
| EP | 0 551 876 A2 | 7/1993 |
| EP | 1 473 072 A1 | 11/2004 |
| EP | 1 688 173 A2 | 8/2006 |
| JP | 03-193116 A | 8/1991 |
| JP | 7-232033 A | 9/1995 |
| JP | 2809381 B2 | 10/1998 |
| JP | 11-343814 A | 12/1999 |
| JP | 2004-323339 A | 11/2004 |
| JP | 2006-213580 A | 8/2006 |
| JP | 4274846 B2 | 6/2009 |

OTHER PUBLICATIONS

"Energy and the Global Environment", Research Organization for Information Science and Technology, Mar. 1998.

Canadian Office Action dated May 31, 2011, issued in corresponding Canadian Patent Application No. 2,688,515.

European Search Report dated Oct. 11, 2010, issued in corresponding European Patent Application No. 09179774.6.

European Patent Office Intention to Grant dated Oct. 1, 2012, issued in corresponding European Patent Application No. 09179774.6.

Japanese Office Action dated May 14, 2013, issued in corresponding Japanese patent Application No. 2009-169322 with English translation.

Decision to Grant a Patent dated Jan. 21, 2014, corresponding to Japanese Application No. 2009-169322 with English Translation. (4 pages).

\* cited by examiner

CARBON DIOXIDE RECOVERY SYSTEM AND METHOD

TECHNICAL FIELD

The present invention relates to a carbon dioxide recovery system and method that recycle a carbon dioxide absorbent without fail, even when an operation load of a boiler or a steam turbine in a power generating system fluctuates.

BACKGROUND ART

It has come to be pointed out that one of the causes of the global warming is a greenhouse effect of $CO_2$, and it has became an urgent task, also internationally, to provide a countermeasure for $CO_2$ to protect the global environment against the warming. $CO_2$ is generated by any human activities combusting fossil fuels, and there are increasing demands for suppressing $CO_2$ emissions. Along with such an increasing demand, researchers are energetically investigating methods for reducing and recovering $CO_2$ included in flue gas, applicable to a power plant that consumes a large amount of fossil fuels, such as a thermal plant. In such a method, flue gas emitted from a boiler is brought into contact with an amine-based $CO_2$ absorbent to allow such absorbent to absorb the $CO_2$, and the recovered $CO_2$ is stored therein without being released into the air. As processes for reducing and recovering $CO_2$ from the flue gas using the $CO_2$ absorbent, a carbon oxide recovering system is used that brings flue gas into contact with the $CO_2$ absorbent in an absorber, heats an absorbent that has absorbed $CO_2$ in a regenerator, isolates $CO_2$ as well as recycling the absorbent, and circulates the absorbent back to the absorber and reuses the absorbent therein.

In the carbon dioxide recovery system, the absorbent absorbs carbon dioxide included in the gas in the absorber, then the regenerator heats the absorbent to separate the carbon dioxide from the absorbent, and recovers the carbon dioxide thus separated. The absorber uses the regenerated absorbent in a cyclic manner.

To separate and recover the carbon dioxide in the regenerator, the absorbent needs to be heated in a reboiler. Therefore, heating steam at a predetermined pressure needs to be supplied in the reboiler.

Japanese Patent Application Laid-open No. H3-193116 discloses a method to use part of the steam generated in power plants and regenerate steam for this purpose.

CITATION LIST

Patent Literature

[Patent Literature 1] Japanese Patent Application Laid-open No. H3-193116

Non Patent Literature

[Non Patent Literature 1] *Enerugi to chikyu kankyo (Energy and the Global Environment)* http://www.rist.or.jp/atomica/data/dat_detail.php?Title_No=01-04-01-02

SUMMARY OF INVENTION

Technical Problem

In carbon dioxide recovery equipment installed in chemical plants, a certain amount of steam is always available. By contrast, carbon dioxide recovery equipment in power plants has a problem in taking out steam therefrom in that the pressure of turbine steam fluctuates depending on changes in the operation load based on power demand levels, whereby the steam cannot be supplied to reboilers of the carbon dioxide recovery equipment under stable pressure conditions.

Power sources, generally, can be classified into three types in terms of their power supply capabilities: (1) Base supply capability that operates with an almost constant output level, (2) Peak supply capability that operates depending on changes in power demand levels and supplies power as required mainly at peak demands, and (3) Middle supply capability that plays an intermediate role between the other two. As disclosed in *Enerugi to chikyu kankyo (Energy and the Global Environment)*, efficient operations are achieved by designating: power sources that are superior in long-term economical efficiency and fuel supply stability for providing the base supply capability, whose utilization rate is high; power sources that are less costly and superior in load following capability for providing the peak supply capability, whose annual utilization rate is low and demand for load following capability is high; and power sources that have intermediate features between the other two for providing the middle supply capability.

In power plants with the peak supply capability or the middle supply capability, a proposal of a carbon dioxide recovering system that can regenerate a carbon dioxide absorbent without fail, depending on load fluctuations even when the operation load of a boiler fluctuates, is desired.

The present invention is made in consideration of the above, and an object of the present invention is to provide a carbon dioxide recovering system and method that can regenerate a carbon dioxide absorbent without fail, even when the operation loads of a boiler and a steam turbine fluctuate.

Solution to Problem

According to an aspect of the present invention, a carbon dioxide recovery system includes: a high-pressure turbine; a medium-pressure turbine; a low-pressure turbine; a boiler to generate steam for driving the turbines; a carbon dioxide recovery unit including a carbon dioxide absorber that absorbs and reduces carbon dioxide in combustion flue gas discharged from the boiler by means of a carbon dioxide absorbent, and a carbon dioxide regenerator that treats a carbon dioxide absorbent having absorbed carbon dioxide and regenerates a regenerated carbon dioxide absorbent; a first steam extraction line to extract steam from an inlet of the low-pressure turbine; a first auxiliary turbine that is coupled to the first steam extraction line and recovers power by means of the steam thus extracted; a first steam delivery line to supply discharged steam discharged from the first auxiliary turbine to a reboiler as a heat source for causing the carbon dioxide regenerator to treat the carbon dioxide absorbent having absorbed carbon dioxide for regeneration; and a controller that controls driving of the first auxiliary turbine while keeping pressure of the discharged steam to be supplied to the reboiler within an optimum tolerance range for the reboiler corresponding to a fluctuation in an operation load of the boiler or steam turbines of a power generation system.

Advantageously, the carbon dioxide recovery system further includes a bypass line that bypasses the first auxiliary turbine from the first steam extraction line to supply the steam directly to the reboiler.

Advantageously, the carbon dioxide recovery system further includes an outlet steam extraction line to extract part of the steam at an outlet of the low-pressure turbine and supply the part of the steam to the reboiler as a heat source.

Advantageously, in the carbon dioxide recovery system, the first auxiliary turbine that is coupled to the first steam extraction line and recovers power by means of the extracted steam is provided in plurality.

Advantageously, the carbon dioxide recovery system further includes: a second steam extraction line to extract the steam from an inlet of the medium-pressure turbine; a second auxiliary turbine that is coupled to the second steam extraction line and recovers power by means of the steam thus extracted; and a second steam delivery line to supply discharged steam discharged from the second auxiliary turbine to the reboiler as a heat source.

Advantageously, in the carbon dioxide recovery system, the first auxiliary turbine or the second auxiliary turbine recovers power for any one of a pump, a blower, and a compressor used in the carbon dioxide recovery system.

According to another aspect of the present invention, a carbon dioxide recovery method includes recovering carbon dioxide absorbed in the carbon dioxide absorbent with the carbon dioxide recovery system described above.

Advantageous Effects of Invention

According to the present invention, steam to be used in the reboiler for regenerating the carbon dioxide absorbent can stably be supplied depending on load fluctuations even when the operation load of the boiler or the steam turbine of the power generating system fluctuates, and the absorbent can be regenerated without fail. As a result, carbon dioxide is stably recovered.

DESCRIPTION OF EMBODIMENTS

The present invention will be described in detail with reference to the accompanying drawings. The embodiments below are not intended to limit the scope of the present invention. Elements described in the embodiments include their variations readily thought of by those skilled in the art and substantially equivalent elements.

Example 1

Figure 1:
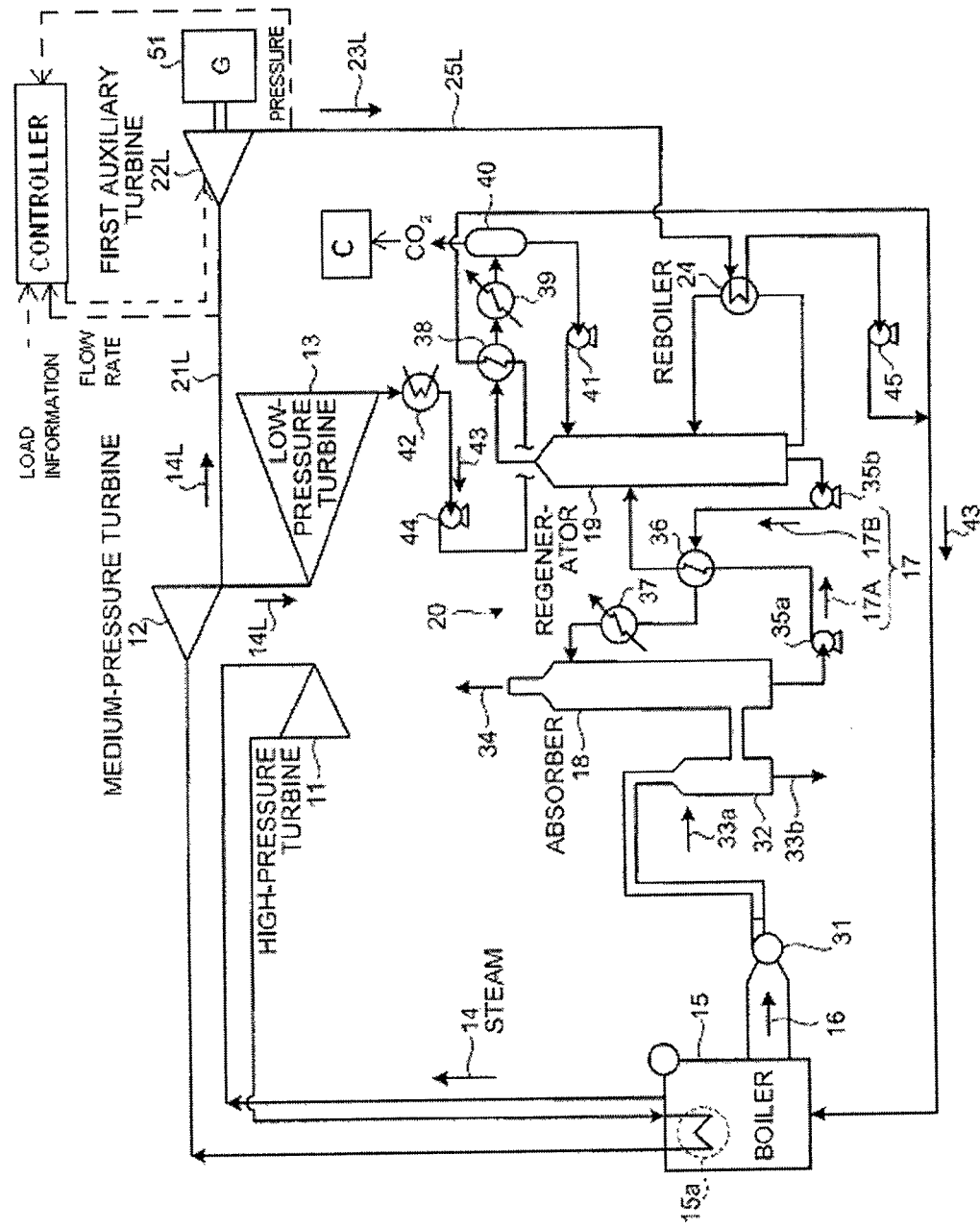
FIG. 1 is a schematic of a carbon dioxide recovery system.
Figure 2:
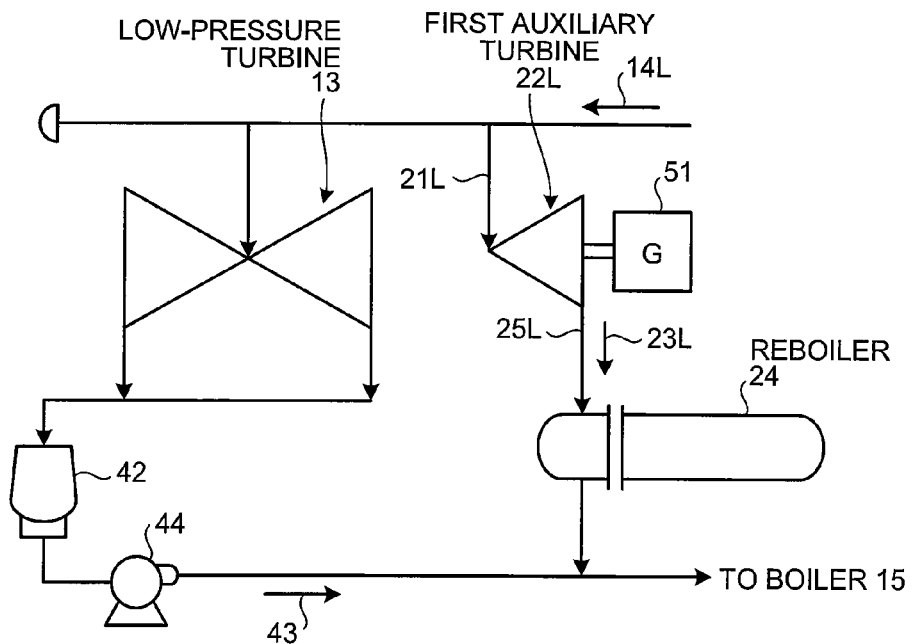
FIG. 2 is a schematic of a steam piping system according to a first embodiment of the present invention.

A carbon dioxide recovery system according to an embodiment of the present invention will now be described with reference to some drawings. FIG. 1 is a schematic of a carbon dioxide recovery system. FIG. 2 is a schematic of a steam piping system according to the present embodiment, illustrating turbines that drive a single generator on a single shaft. Note that these turbines may drive different generators on multiple shafts.

Referring to FIGS. 1 and 2, the carbon dioxide recovery system according to the present embodiment includes a high-pressure turbine 11, a medium-pressure turbine 12, and a low-pressure turbine 13; a boiler 15 to generate steam 14 for driving these turbines; a carbon dioxide recovery unit 20 including a carbon dioxide absorber (absorber) 18 that absorbs and reduces carbon dioxide in combustion flue gas 16 discharged from the boiler 15 by means of a carbon dioxide absorbent 17 and a carbon dioxide regenerator (regenerator) 19 that makes a carbon dioxide absorbent 17A having absorbed carbon dioxide release the carbon dioxide to treat the absorbent and regenerate a regenerated carbon dioxide absorbent 17B; a first steam extraction line 21L to extract steam 14L from an inlet of the low-pressure turbine 13; a first auxiliary turbine 22L that is coupled to the first steam extraction line 21L and recovers power by means of the steam 14L thus extracted; a first steam delivery line 25L to supply discharged steam 23 discharged from the first auxiliary turbine 22L to a reboiler 24 as a heat source for causing the carbon dioxide regenerator 19 to treat the carbon dioxide absorbent 17A having absorbed carbon dioxide for regeneration; and a controller that controls driving of the first auxiliary turbine 22L while keeping pressure of the discharged steam 23 to be supplied to the reboiler 24 within a tolerance range for the reboiler's optimum pressure (approximately 0.33 megapascal±0.05 megapascal) corresponding to a fluctuation in an operation load of the boiler 15 or the turbines (the high-pressure turbine 11, the medium-pressure turbine 12, and the low-pressure turbine 13).

The carbon dioxide absorbent 17 contains a carbon dioxide absorbent (rich solution) 17A having absorbed carbon dioxide in the absorber 18 and a regenerated carbon dioxide absorbent (lean solution) 17B regenerated by releasing carbon dioxide in the regenerator 19, and circulates the absorber 18 and the regenerator 19 to be reused.

Referring to FIG. 1, the combustion flue gas 16 containing carbon dioxide ($CO_2$) from the boiler 15 has its pressure boosted by a boiler combustion flue gas booster fan 31, and is then delivered to a combustion flue gas cooler 32 and cooled by way of cooling water 33a, and delivered to the absorber 18. Cooling water effluent 33b is discharged out of the system. In the absorber 18, the combustion flue gas 16 comes in contact with the regenerated (e.g., alkanolamine-based) absorbent 17, and $CO_2$ contained in the combustion flue gas 16 is absorbed in the absorbent by a chemical reaction. Resultant combustion flue gas 34 from which $CO_2$ is reduced is discharged out of the system.

The absorbent (rich solution) 17A having absorbed $CO_2$ has its pressure boosted by a rich solvent pump 35a, and is heated by way of the regenerated absorbent (lean solution) 17B in a rich/lean solvent heat exchanger 36, and delivered to the regenerator 19.

In a lower part of the regenerator 19, the absorbent is heated by way of discharged steam (0.33 megapascal) 23L supplied to the reboiler 24. Resultant $CO_2$ accompanied with the steam is guided to an overhead condenser 38 through the top of the regenerator 19.

Low-pressure steam condensed water condensed in the reboiler 24 has its pressure boosted by a reboiler condensate pump 45, and is mixed with pre-heated boiler water supply 43 to increase the temperature of water supplied to the boiler.

The boiler water supply 43, whose temperature has been thus increased, is supplied to the boiler 15.

With the boiler water supply 43 having had its pressure boosted by a boiler water supply pump 44 and pre-heated in the overhead condenser 38, the $CO_2$ accompanied with the steam discharged from the regenerator 19 is cooled in an overhead cooler 39 and dehydrated in a separator 40. Resultant $CO_2$ is then guided to another process where it is compressed by a compressor C and liquefied and recovered.

Water separated by the separator 40 is supplied to the regenerator 19 through a condensed water circulating pump 41. The absorbent (lean solution) 17B has its pressure boosted by a lean solvent pump 35b, and is then cooled by means of the $CO_2$ absorbent (rich solution) 17A having absorbed $CO_2$ in the rich/lean solvent heat exchanger 36, further cooled in a lean solvent cooler 37, and supplied to the absorber 18.

The heated steam 14, at high pressure and high temperature, generated by the boiler 15 is used to drive the high-pressure turbine 11, then reheated as high-pressure turbine flue gas by a reheater 15a included in the boiler 15, and delivered as reheated medium-pressure steam to the medium-pressure turbine 12 and subsequently to the low-pressure turbine 13.

The steam 14L is extracted from the inlet of the low-pressure turbine 13 through the first steam extraction line 21L. The first auxiliary turbine 22L recovers power by means of the steam 14L thus extracted. Subsequently, the discharged steam 23L discharged from the first auxiliary turbine 22L is supplied to the reboiler 24 through the first steam delivery line 25 as a heat source for causing the carbon dioxide regenerator 19 to treat the carbon dioxide absorbent 17A having absorbed carbon dioxide for regeneration.

In the first auxiliary turbine 22L, a controller controls driving of the first auxiliary turbine 22L including a generator 51 while keeping the pressure of the discharged steam 23L to be supplied to the reboiler 24 within an optimum tolerance range for the reboiler (e.g., approximately 0.33 megapascal±0.05 megapascal) corresponding to fluctuations in the operation loads of the boiler 15 and the steam turbines (the high-pressure turbine 11, the medium-pressure turbine 12, and the low-pressure turbine 13) of the power generation system. Note that the optimum tolerance range for the reboiler is given merely as an example, and may fluctuate based on such conditions as absorbent compositions and regenerator configurations.

Flue gas from the low-pressure turbine 13 is condensed in a condenser 42. Resultant condensed water is delivered as the boiler water supply 43 to the overhead condenser 38 through the boiler water supply pump 44.

Examples of the carbon dioxide absorbent 17 for absorbing $CO_2$ may include amine-based absorbents specific examples of which include: monoethanolamine, diethanolamine, triethanolamine, methyldiethanolamine, diisopropanolamine, and diglycolamine as alkanolamines; and hindered amines. While a solution of one or more of these compounds can be optionally used, a monoethanolamine solution is preferably used in general.

Below is an example explanation of control steps that the carbon dioxide recovery system according to the present embodiment follows corresponding to the actual load.

1) The controller receives operation load information on the current power generation level.

2) Based on the load information, the controller inputs information on the flow rate of the steam 14L supplied to the inlet of the low-pressure turbine 13 and to the first auxiliary turbine 22L.

3) The first auxiliary turbine 22L is driven with the steam 14L, thereby generating power. The controller controls driving of the first auxiliary turbine 22L while keeping the pressure of the discharged steam 23L to be supplied to the reboiler 24 within a tolerance range for the reboiler's optimum pressure (e.g., approximately 0.33 megapascal).

4) Subsequently, when the controller receives information on load fluctuations in the boiler, e.g., when the load is changed to 75%, information on the flow rate of the steam 14L supplied to the inlet of the low-pressure turbine 13 based on the amount of steam required for regenerating an absorbent is input. Based on the information, the controller controls driving of the first auxiliary turbine 22L while keeping the pressure of the discharged steam 23L to be supplied to the reboiler 24 within a tolerance range for the reboiler's optimum pressure (e.g., approximately 0.33 megapascal). As a result, while a power generation output of 33 megawatts under 100% load is dropped to 18 megawatts under 75% load in the first auxiliary turbine 22L, the pressure of the discharged steam 23L to be supplied to the reboiler 24 can be kept within a tolerance range for the reboiler's optimum pressure (e.g., approximately 0.33 megapascal), whereby the absorbent is regenerated in a stable manner.

Accordingly, the present embodiment provides the most efficient power generation system for all load ranges of the power generation system even with carbon dioxide recovery equipment incorporated therein.

Specifically, when the first auxiliary turbine 22L recovers power up until the steam 14L extracted from the inlet of the low-pressure turbine 13 reaches the steam condition (approximately 0.33 megapascal) suitable for the reboiler 24 of the regenerator 19, the steam pressure of the steam 14L at the inlet of the low-pressure turbine 13 changes corresponding to load fluctuations in the power generation system. By providing the auxiliary turbine and controlling the driving of the auxiliary turbine so as to keep the pressure of steam to be supplied to the reboiler 24 constant, the steam for the reboiler 24 to regenerate an absorbent can be supplied in a stable manner. As a result, the absorbent is regenerated without fail. Consequently, the carbon dioxide recovery equipment provides constantly stable recovery of carbon dioxide.

The present invention enables the carbon dioxide recovery equipment to be incorporated in the power generation system without requiring any changes in its steam system configuration. The present invention also reduces an output drop of the power generation system by causing the first auxiliary turbine 22L to recover power by means of steam at the inlet of the low-pressure turbine.

Even when loads on the boiler 15 and the steam turbines (the high-pressure turbine 11, the medium-pressure turbine 12, and the low-pressure turbine 13) fluctuate (100% to 50%), the first auxiliary turbine 22L is driven not under rated conditions but corresponding to the pressure and the flow rate of steam, so that the outlet pressure of the steam 23L from the first auxiliary turbine 22L can be kept constant. Accordingly, by keeping all load ranges of the plant within a tolerance range of the optimum pressure (e.g., approximately 0.33 megapascal±0.05 megapascal) for the reboiler 24 of the carbon dioxide recovery equipment, the absorbent is regenerated in a constantly stable manner.

Example 2

Figure 3:
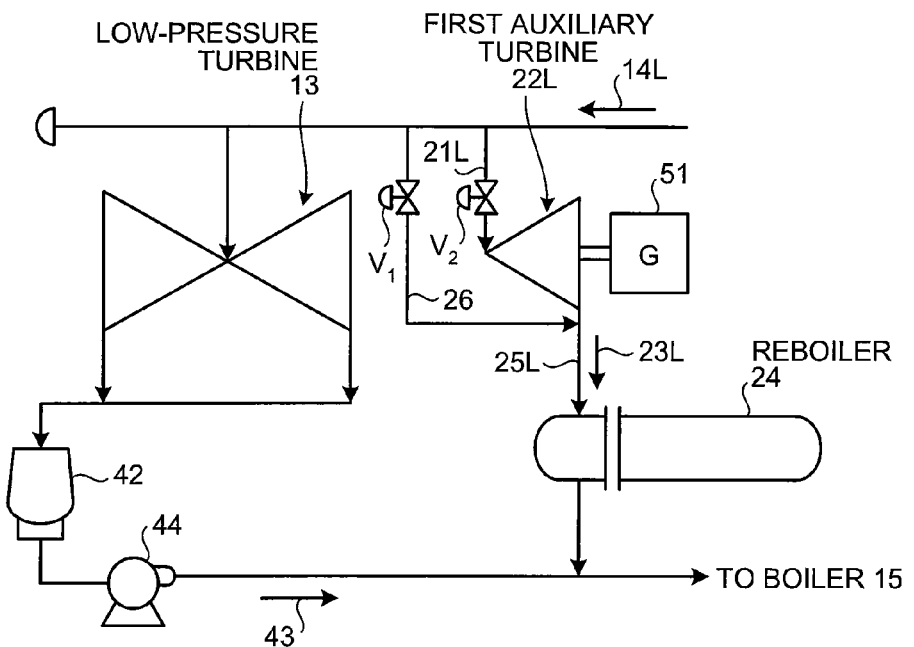
FIG. 3 is a schematic of a steam piping system according to a second embodiment of the present invention.

A carbon dioxide recovery system according to another embodiment of the present invention will now be described with reference to an accompanying drawing. FIG. 3 is a schematic of a steam piping system according to the present embodiment.

Referring to FIG. 3, a bypass line 26 is provided to supply the steam 14L directly to the reboiler 24 from the first steam extraction line 21L, while bypassing the first auxiliary turbine 22L. When operation load is too large for the first auxiliary turbine 22L to supply, the bypass line 26 and valves V1, V2 keep the pressure of the steam to be supplied to the reboiler 24 within a tolerance range. Note that the bypass line 26 is applicable to any of Examples 3 to 6, which will be described below.

Example 3

Figure 4:
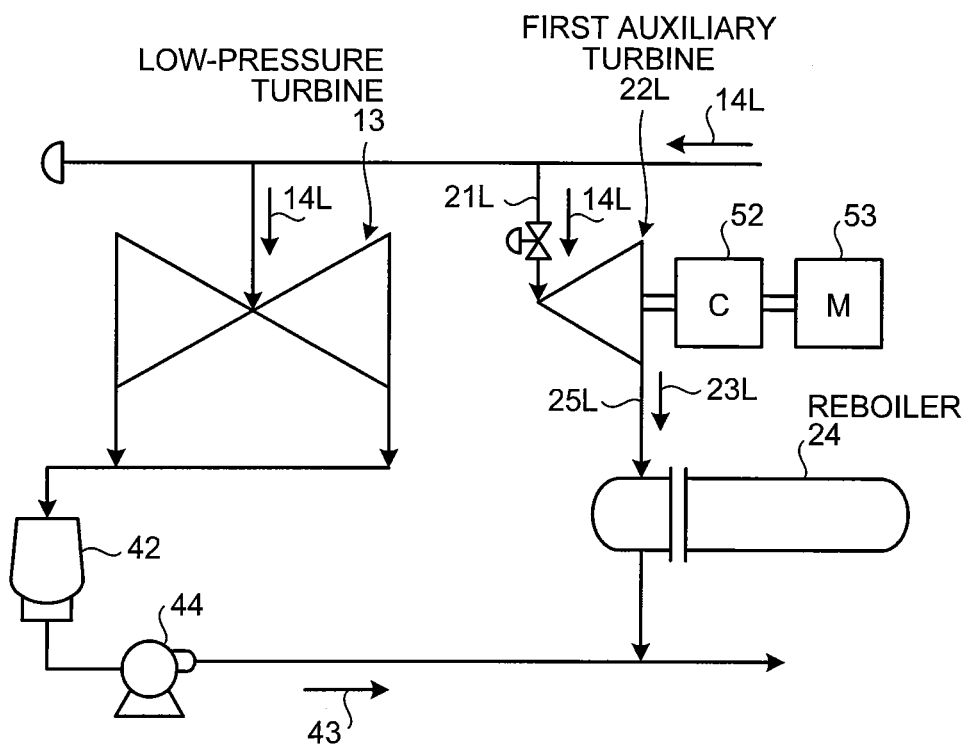
FIG. 4 is a schematic of a steam piping system according to a third embodiment of the present invention.

A carbon dioxide recovery system according to still another embodiment of the present invention will now be described with reference to an accompanying drawing. FIG. 4 is a schematic of a steam piping system according to the present embodiment.

Referring to FIG. 4, a compressor 52 is provided to the first auxiliary turbine 22L. The compressor 52 is driven and a motor 53 may partly cover shortage in power supply.

Example 4

Figure 5:
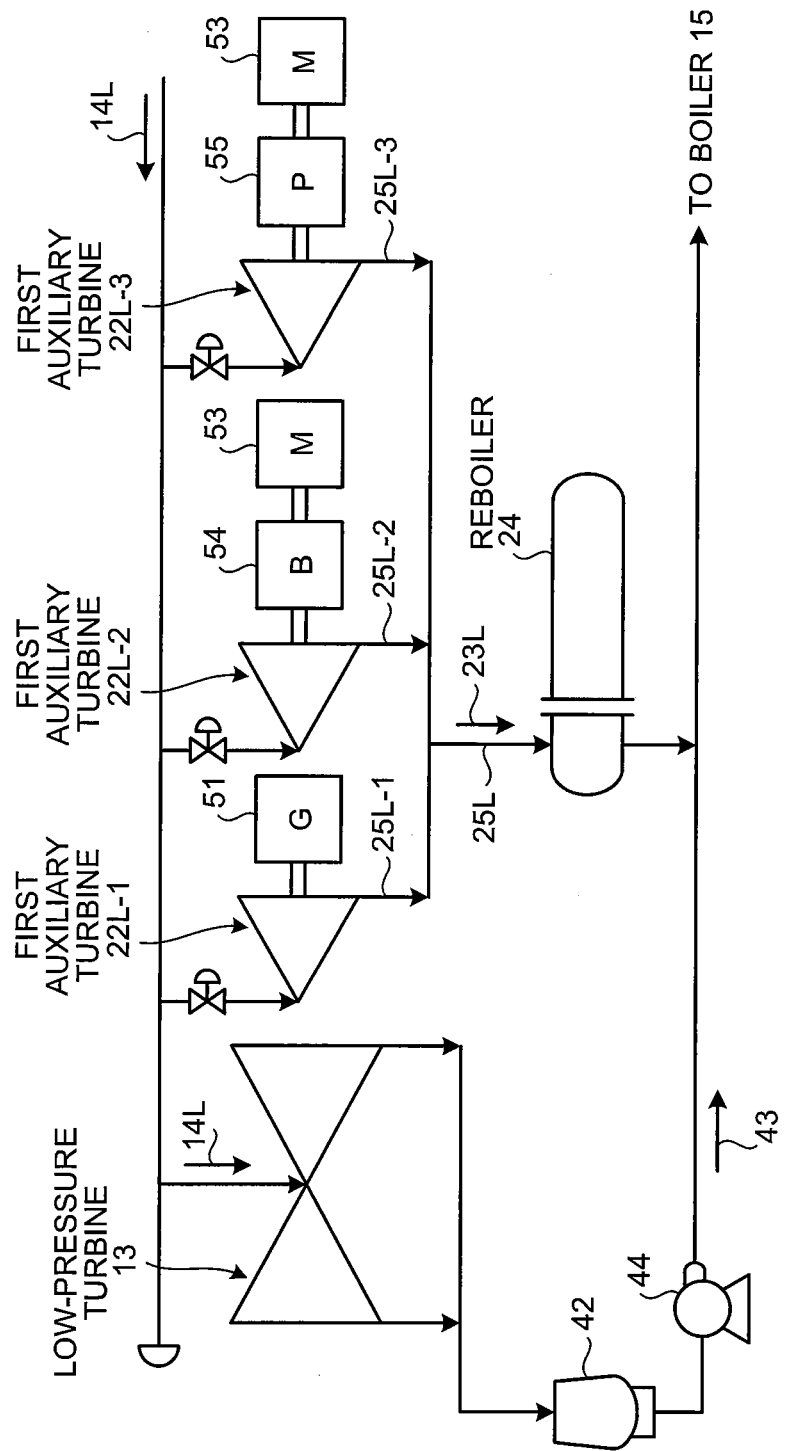
FIG. 5 is a schematic of a steam piping system according to a fourth embodiment of the present invention.

A carbon dioxide recovery system according to still another embodiment of the present invention will now be described with reference to an accompanying drawing. FIG. 5 is a schematic of a steam piping system according to the present embodiment.

Referring to FIG. 5, a plurality of first auxiliary turbines 22L is provided. A blower 54 and a pump 55 are provided to separate first auxiliary turbines 22L and are driven, and respective motors 53 may partly cover shortage in power supply. The operation of the first auxiliary turbine 22L is controlled in such a manner that the discharged steam 23L is kept within a tolerance range for the reboiler's optimum pressure (approximately 0.33 megapascal±0.05 megapascal).

Example 5

Figure 6:
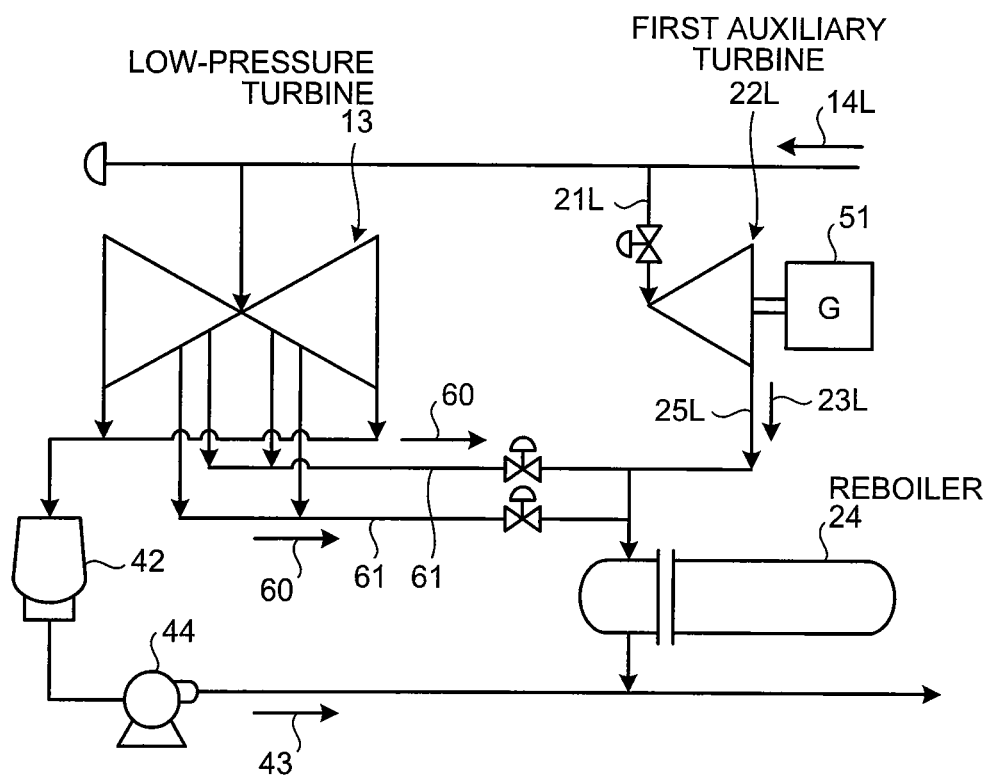
FIG. 6 is a schematic of a steam piping system according to a fifth embodiment of the present invention.

A carbon dioxide recovery system according to still another embodiment of the present invention will now be described with reference to an accompanying drawing. FIG. 6 is a schematic of a steam piping system according to the present embodiment.

Referring to FIG. 6, an outlet steam extraction line 61 is provided to extract part 60 of the steam at an outlet of the low-pressure turbine 13 and supply the part 60 of the steam to the reboiler 24 as a heat source. The part 60 of the steam is merged with the discharged steam 23L from the first auxiliary turbine 22L, whereby the merged stream is supplied to the reboiler 24. The operation of the first auxiliary turbine 22L is controlled in such a manner that the merged steam is kept within a tolerance range for the reboiler's optimum pressure (approximately 0.33 megapascal±0.05 megapascal).

Example 6

Figure 7:
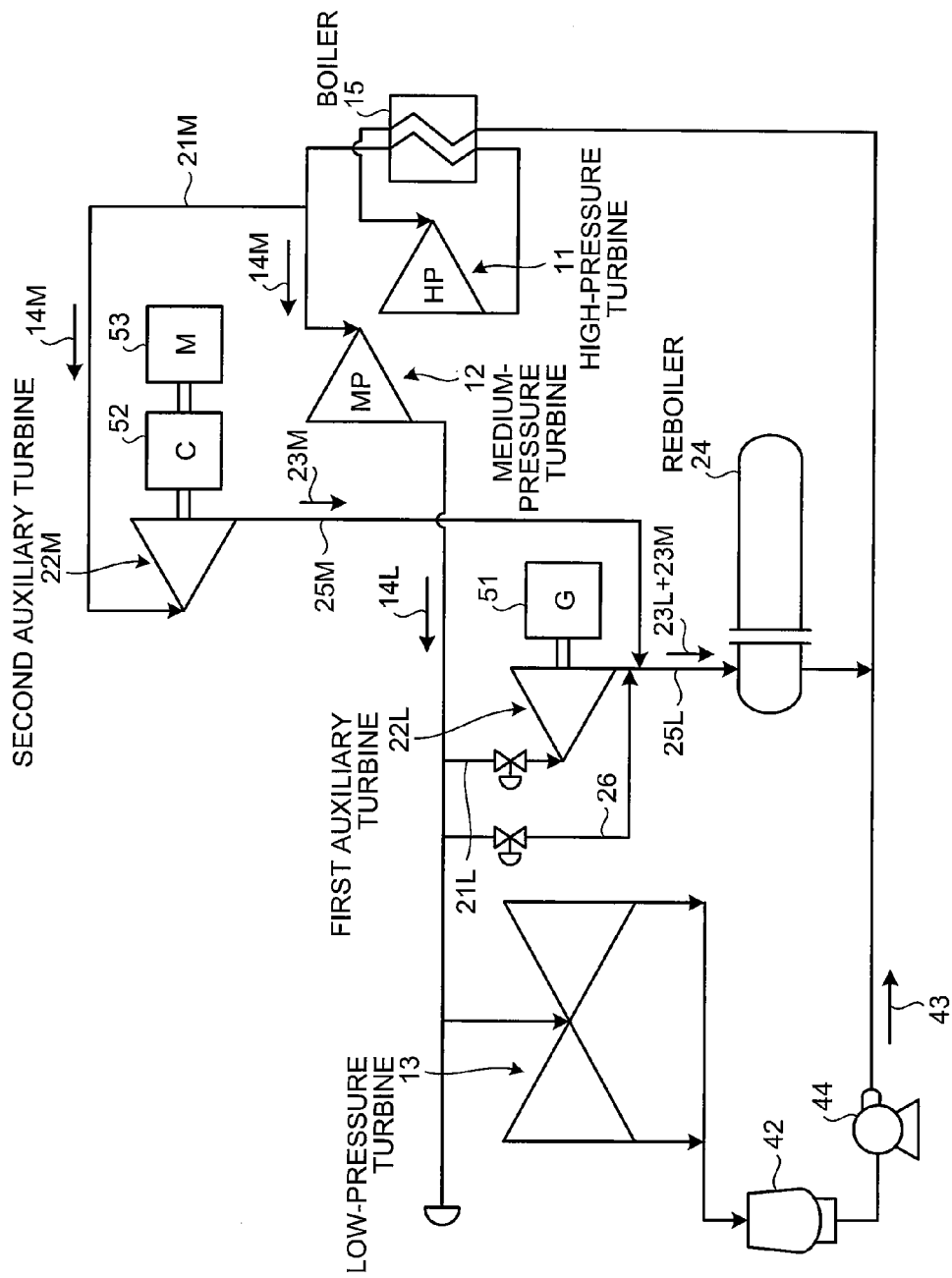
FIG. 7 is a schematic of a steam piping system according to a sixth embodiment of the present invention.

A carbon dioxide recovery system according to still another embodiment of the present invention will now be described with reference to an accompanying drawing. FIG. 7 is a schematic of a steam piping system according to the present embodiment.

Referring to FIG. 7, the present embodiment provides the arrangement of Example 1 further including a second steam extraction line 21M to extract steam 14M from an inlet of the medium-pressure turbine 12, a second auxiliary turbine 22M that is coupled to the second steam extraction line 21M and recovers power by means of the steam 14M thus extracted; and a second steam delivery line 25M to supply steam 23M discharged from the second auxiliary turbine 22M to the reboiler 24 as a heat source.

The compressor 52 is provided to the second auxiliary turbine 22M and is driven. When the pressure of the extracted steam 14M drops due to load fluctuations, the motor 53 may partly cover shortage in power supply.

According to the present embodiment, the second auxiliary turbine 22M for the compressor recovers power up until the steam 14M extracted from the inlet of the medium-pressure turbine 12 reaches the steam condition (0.33 megapascal) suitable for the reboiler 24, whereby the recovered carbon dioxide can be used in the compressor where it is liquefied. In a similar manner, the first auxiliary turbine 22L recovers power up until the steam 14L extracted from the inlet of the low-pressure turbine 13 reaches the steam condition (0.33 megapascal) suitable for the reboiler 24.

Despite steam pressure changes in the power generation system corresponding to load fluctuations, providing the first auxiliary turbine 22L and the second auxiliary turbine 22M can keep the pressure of the steams to be supplied by the reboiler 24 constant.

When operation load is too large for the first auxiliary turbine 22L to supply, the associated bypass line 26 and valves V perform control to keep the pressure of the steams to be supplied to the reboiler 24 constant.

Advantageous effects of the present invention will now be described, but they do not limit the present invention in any way.

Power transmission reduction rates achieved by a process in which the process illustrated in FIG. 1 according to the present invention is applied to coal-fired thermal power plant equipment with a power generation capacity of 900 megawatts are listed in Table 1.

Figure 8:
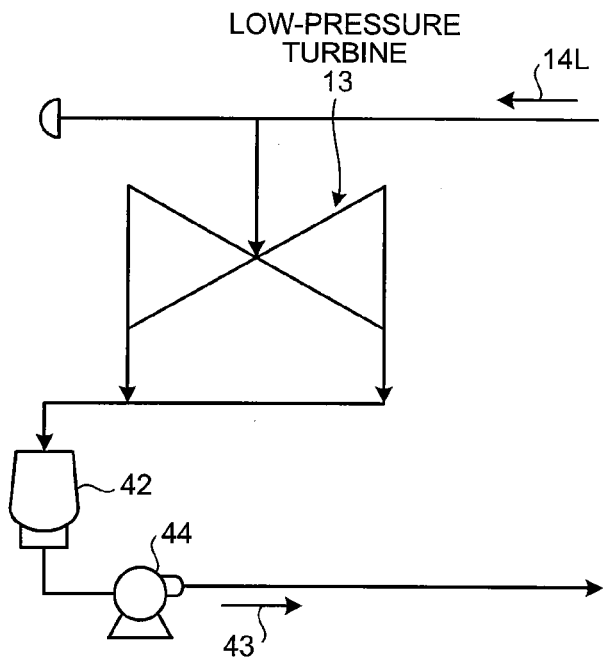
FIG. 8 is a schematic of a steam piping system according to a first comparative example.
Figure 9:
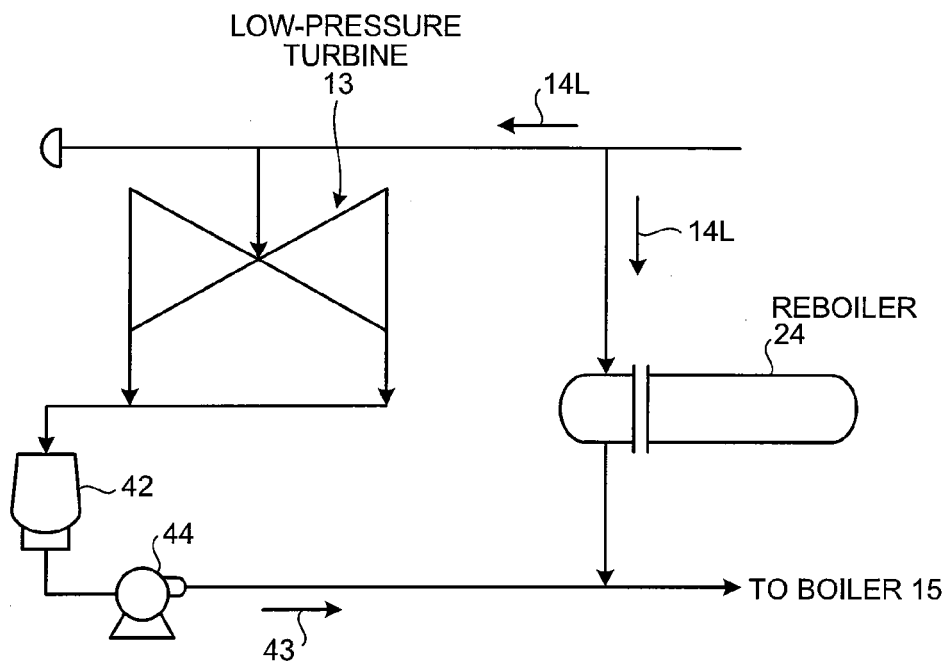
FIG. 9 is a schematic of a steam piping system according to a second comparative example.

For comparative purposes, Comparative Example 1 where no steam is supplied (main turbine power generation output: 900 megawatts) is used as a reference (see FIG. 8), and a conventional process for directly bleeding the air through the inlet of the low-pressure turbine is set as Comparative Example 2 (see FIG. 9).

Working Example 1 involves a power generation system corresponding to Example 1 above, where the first auxiliary turbine 22L recovers power by means of the extracted steam 14L, and the operation of the first auxiliary turbine 22L is controlled in such a manner that the discharged steam 23L discharged from the first auxiliary turbine 22L is kept within a tolerance range for the reboiler's optimum pressure (approximately 0.33 megapascal±0.05 megapascal).

Figure 10:
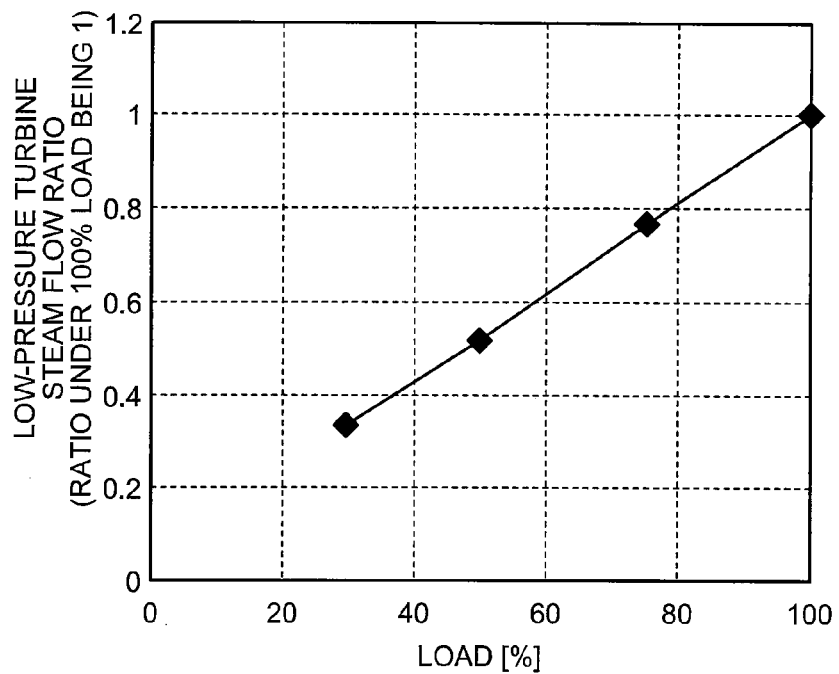
FIG. 10 is a schematic of a relationship between load fluctuations and low-pressure turbine steam flow ratio.
Figure 11:
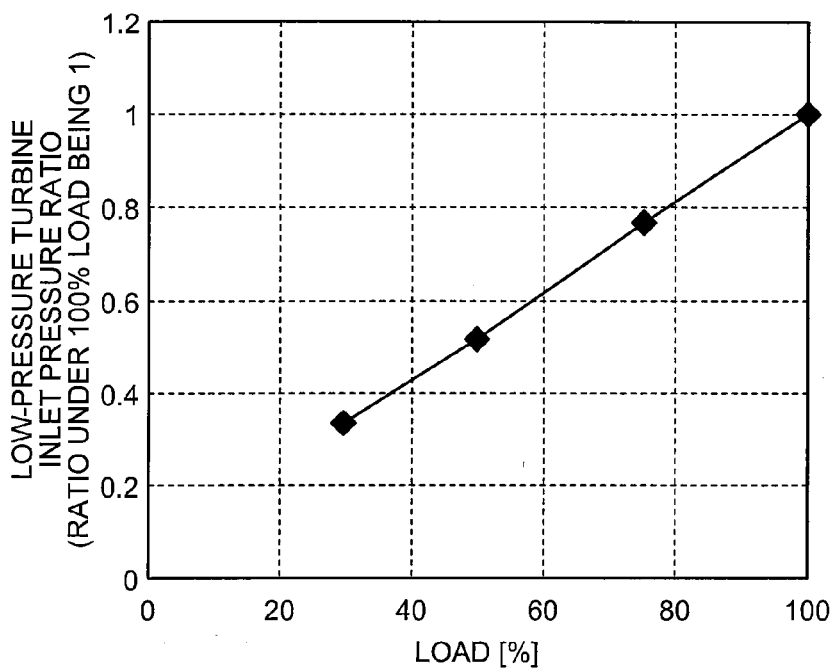
FIG. 11 is a schematic of a relationship between load fluctuations and low-pressure turbine inlet pressure ratio.

Decreases in power transmission output were measured for 100%, 75%, and 50% loads on the power generation system. FIG. 10 is a schematic of a relationship between load fluctuations and low-pressure turbine steam flow ratio. FIG. 11 is a schematic of a relationship between load fluctuations and low-pressure turbine inlet pressure ratio. These ratios decreased in line with load fluctuations.

Referring to Table 1 (100% load, 75% load) and Table 2 (50% load), Working Example 1 resulted in a 19.6% decrease in power transmission, which was smaller than in Comparative Example 2. Regeneration of an absorbent was achieved with the reboiler.

Working Example 2 involves a power generation system corresponding to Example 3 above (see FIG. 4), where the first auxiliary turbine 22L recovers power for the compressor, and the operation of the first auxiliary turbine 22L is controlled in such a manner that the discharged steam 23L discharged from the first auxiliary turbine 22L is kept within a tolerance range for the reboiler's optimum pressure (approximately 0.33 megapascal±0.05 megapascal).

Referring to Tables 1 and 2, Working Example 2 resulted in a 19.6% decrease in power transmission, which was smaller than in Comparative Example 2. Because the auxiliary turbine 22L provided an output of only 33 megawatts, an output of 24 megawatts out of the major turbine power generation output was supplied to the compressor.

Working Example 3 involves a power generation system corresponding to Example 4 above (see FIG. 5), where a plurality of first auxiliary turbines 22L is provided. Power for the blower and the pump is recovered, and the operation of the first auxiliary turbine 22L is controlled in such a manner that the discharged steam 23 discharged from the first auxiliary turbine 22L is kept within a tolerance range for the reboiler's optimum pressure (approximately 0.33 megapascal±0.05 megapascal).

Referring to Table 1, Working Example 3 resulted in a 20.2% decrease in power transmission, which was smaller than in Comparative Example 2.

Working Example 4 involves a power generation system corresponding to Example 5 above (see FIG. 6), where the outlet steam extraction line 61 is provided to extract part of the steam at the outlet of the low-pressure turbine 13 and supply the part of the steam to the reboiler 24 as a heat source. The part of the steam is merged with the discharged steam 23L from the first auxiliary turbine 22L, and the operation of the first auxiliary turbine 22L is controlled in such a manner that the merged steam 23L is kept within a tolerance range for the reboiler's optimum pressure (approximately 0.33 megapascal±0.05 megapascal).

Referring to Table 1, Working Example 4 resulted in a 19.8% decrease in power transmission, which was smaller than in Comparative Example 2.

Working Example 5 involves a power generation system corresponding to Example 6 above (see FIG. 7), where the second auxiliary turbine 22M for the compressor recovers power up until the steam 14M extracted from the inlet of the medium-pressure turbine 12 reaches the steam condition (0.33 megapascal) suitable for the reboiler 24. The recovered carbon dioxide is used in the compressor where it is liquefied. The first auxiliary turbine 22L is so controlled to recover power under the steam condition (0.33 megapascal) suitable for the reboiler 24.

Referring to Table 1, Working Example 5 resulted in a 19.4% decrease in power transmission, which was smaller than in Comparative Example 2.

Unlike Working Example 2, because the second auxiliary turbine 22M for the compressor provided an output of 57 megawatts, it was capable of driving the compressor without any additional output supplied out of the major turbine power generation output.

TABLE 1

| | | | Case | | | | | | |
|---|---|---|---|---|---|---|---|---|---|
| | | | Working Example 1 | Working Example 2 | Working Example 3 | Working Example 4 | Working Example 5 | Comparative Example 1 | Comparative Example 2 |
| Load on power generation system | | | 100% | 75% | 100% | 100% | 100% | 100% | 100% |
| LP header steam | | °C. | 334.4 | 341.5 | 334.4 | 334.4 | 334.4 | 334.4 | 334.4 |
| | | MPa | 0.73 | 0.57 | 0.73 | 0.73 | 0.73 | 1.19 | 0.76 |
| | | Ton/h | 1163 | 919 | 1163 | 1172 | 1172 | 1908 | 1210 |
| | | kJ/kg | 3130 | 3148.5 | 3130 | 3130 | 3130 | 3120 | 3130 |
| Reboiler inlet steam | | °C. | 246.1 | 277.7 | 246.1 | 261.5 | 245 | 241 | — | 334.4 |
| | | MPa | 0.33 | 0.33 | 0.33 | 0.33 | 0.33 | 0.33 | — | 0.76 |
| | | Ton/h | 708 | 518 | 708 | 699 | 708 | 713 | | 696 |
| | | kJ/kg | 2959 | 3023 | 2959 | 2990 | 2657 | 2948 | | 3130 |
| Main turbine power generation output | | MW | 758 | 572 | 758 | 759 | 759 | 717 | 900 | 766 |
| Auxiliary turbine power generation output | | MW | 33 | 18 | 33 | Blower turbine 6 Pump turbine 4.5 Auxiliary turbine 16.6 | 30 | Compressor turbine 57 Auxiliary turbine 19 | — | — |
| Decreases in turbine power generation output | | MW | 109 | 85 | 109 | 114 | 111 | 107 | — | 134 |
| | | % | 12.2 | 12.6 | 12.2 | 12.7 | 12.3 | 11.9 | — | 14.9 |
| Major power consumption in CO$_2$ recovery unit | Blower | MW | 6 | 4.5 | | 6 | | | — | 6 |
| | Pump | MW | 4.5 | 3.4 | | 4.5 | | | — | 4.5 |
| | Compressor | MW | 57 | 51.3 | | 57 | | | — | 57 |
| Decreases in power transmission output | | MW | 176.5 | 144.2 | 176.5 | 181.5 | 178.5 | 174.5 | — | 201.5 |
| | | % | 19.6 | 21.4 | 19.6 | 20.2 | 19.8 | 19.4 | — | 22.4 |

TABLE 2

<50% load on power generation system>

| | | | Case | | | |
|---|---|---|---|---|---|---|
| | | | Working Example 1 | Working Example 5 | Comparative Example 1 | Comparative Example 2 |
| LP header steam | | °C. | 347.9 | 347.9 | 347.9 | 347.9 |
| | | MPa | 0.39 | 0.39 | 0.62 | 0.39 |
| | | Ton/h | 623 | 624 | 1004 | 629 |
| | | kJ/kg | 3165 | 3165 | 3165 | 3165 |

TABLE 2-continued

<50% load on power generation system>

| | | Case | | | |
|---|---|---|---|---|---|
| | | Working Example 1 | Working Example 5 | Comparative Example 1 | Comparative Example 2 |
| Reboiler inlet steam | °C. | 327.4 | 322.4 | — | 347.9 |
| | MPa | 0.33 | 0.33 | — | 0.39 |
| | Ton/h | 365 | 364 | — | 363 |
| | kJ/kg | 3125 | 3135 | — | 3165 |
| Main turbine power generation output | MW | 378 | 333 | 450 | 379 |
| Auxiliary turbine power generation output | MW | 4 | 46/0.2 | — | — |
| Decreases in turbine power generation output | MW | 68 | 71 | — | 71 |
| | % | 15.1 | 15.8 | — | 15.8 |
| Major power consumption in   Blower | MW | 3 | 3 | — | 3 |
| Pump | MW | 2.3 | 2.3 | — | 2.3 |
| $CO_2$ recovery unit   Compressor | MW | 46 | 46 | — | 46 |
| Decreases in power transmission output | MW | 119.3 | 122.3 | — | 121.3 |
| | % | 26.5 | 27.2 | — | 27.2 |

As is apparent in the examples above, it has been confirmed that: by adopting the method according to the present invention to use steam extracted from an existing steam line in power generation equipment more efficiently than in conventional processes, power can be recovered, power consumption can be reduced, and steam at the optimum pressure can be stably supplied to the reboiler 24 despite load fluctuations in the boiler and the steam turbines, whereby an absorbent for recovering carbon dioxide in the combustion flue gas 16 discharged from the boiler 15 can be regenerated constantly without fail.

Referring to FIGS. 10 and 11, the steam flow ratio and the inlet pressure ratio decrease in line with a change from 100% load to 50% load. For example, it has been confirmed that even 50% load listed in Table 2 is successfully dealt with as in Working Examples 1 and 5.

In Working Example 5, because the steam 14M at the inlet of the medium-pressure turbine 12 is used, the discharged steam 23M from the auxiliary turbine 22M can be kept under the steam condition (0.33 megapascal) suitable for the reboiler 24. Meanwhile, the steam extraction line 21L that leads to the second auxiliary turbine 22L and the bypass line 26 are closed with the valves V1, V2 at which the steam flows therethrough are stopped.

Consequently, controlling to keep the steam condition (0.33 megapascal) suitable for the reboiler 24 to regenerate an absorbent can be achieved even when load is equal to or less than 50% in Working Example 5.

The invention claimed is:
1. A carbon dioxide recovery system that recycles a carbon dioxide absorbent, even when an operation load of a boiler or a steam turbine in a power generation system fluctuates, comprising:
   a high-pressure turbine;
   a medium-pressure turbine;
   a low-pressure turbine as the steam turbine;
   a boiler to generate steam for driving the turbines;
   a carbon dioxide recovery unit including a carbon dioxide absorber that absorbs and reduces carbon dioxide in combustion flue gas discharged from the boiler by means of a carbon dioxide absorbent, and a carbon dioxide regenerator that treats a carbon dioxide absorbent having absorbed carbon dioxide and regenerates a regenerated carbon dioxide absorbent;
   a first steam extraction line to extract steam from an inlet of the low-pressure turbine;
   a first auxiliary turbine that is coupled to the first steam extraction line via a first valve and recovers power by means of the steam thus extracted;
   a first steam delivery line to supply discharged steam discharged from the first auxiliary turbine to a reboiler as a heat source for causing the carbon dioxide regenerator to treat the carbon dioxide absorbent having absorbed carbon dioxide for regeneration;
   a bypass line that bypasses the first auxiliary turbine and connects between the first steam extraction line and the first steam delivery line via a second valve;
   a controller for receiving operation load information and, based on the load information, for inputting information on the flow rate of steam supplied to the inlet of the low-pressure turbine and to the first auxiliary turbine, that controls driving of the first auxiliary turbine and the first and second valves while keeping pressure of the discharged steam to be supplied to the reboiler within an optimum tolerance range for the reboiler in response to a fluctuation in an operation load of the boiler or steam turbines of a power generation system;
   a second steam extraction line to extract the steam from an inlet of the medium-pressure turbine;
   a second auxiliary turbine that is coupled to the second steam extraction line and recovers power by means of the steam thus extracted; and
   a second steam delivery line to supply discharged steam discharged from the second auxiliary turbine to the reboiler as a heat source.

2. The carbon dioxide recovery system according to claim 1, further comprising an outlet steam extraction line to extract part of the steam at an outlet of the low-pressure turbine and supply the part of the steam to the reboiler as a heat source.

3. The carbon dioxide recovery system according to claim 1, wherein the first auxiliary turbine that is coupled to the first steam extraction line and recovers power by means of the extracted steam is provided in plurality.

4. The carbon dioxide recovery system according to claim 1, wherein the first auxiliary turbine or the second auxiliary turbine recovers power for any one of a pump, a blower, and a compressor used in the carbon dioxide recovery system.

5. A carbon dioxide recovery method comprising:
recovering carbon dioxide absorbed in the carbon dioxide absorbent with the carbon dioxide recovery system according to claim 1.

\* \* \* \* \*